United States Patent
Yamada et al.

(10) Patent No.: US 9,665,374 B2
(45) Date of Patent: May 30, 2017

(54) BINARY TRANSLATION MECHANISM

(71) Applicants: Koichi Yamada, Los Gatos, CA (US); Ashish Bijlani, Santa Clara, CA (US); Jiwei Lu, Pleasanton, CA (US); Cheng Yan Zhao, San Jose, CA (US)

(72) Inventors: Koichi Yamada, Los Gatos, CA (US); Ashish Bijlani, Santa Clara, CA (US); Jiwei Lu, Pleasanton, CA (US); Cheng Yan Zhao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 231 days.

(21) Appl. No.: 14/574,797

(22) Filed: Dec. 18, 2014

(65) Prior Publication Data

US 2016/0179547 A1    Jun. 23, 2016

(51) Int. Cl.
| G06F 7/38 | (2006.01) |
| G06F 13/00 | (2006.01) |
| G06F 9/38 | (2006.01) |
| G06F 9/30 | (2006.01) |

(52) U.S. Cl.
CPC ........ *G06F 9/3806* (2013.01); *G06F 9/30145* (2013.01)

(58) Field of Classification Search
None
See application file for complete search history.

(56) References Cited

U.S. PATENT DOCUMENTS

| 7,712,092 B2 | 5/2010 | Bansal et al. | |
| 7,925,870 B2 | 4/2011 | Ukai et al. | |
| 8,893,100 B2 | 11/2014 | Lovett et al. | |
| 2001/0049782 A1* | 12/2001 | Hsu | G06F 9/3844 712/237 |
| 2007/0033385 A1 | 2/2007 | Smaus et al. | |
| 2009/0254709 A1* | 10/2009 | Agesen | G06F 8/52 711/118 |
| 2011/0197174 A1* | 8/2011 | Wu | G06F 8/53 717/104 |
| 2015/0378731 A1* | 12/2015 | Lai | G06F 9/30174 712/30 |

OTHER PUBLICATIONS

PCT Search Report and Written Opinion, PCT/US2015/060934, 12 pages, Mar. 31, 2016.

* cited by examiner

*Primary Examiner* — Hyun Nam
(74) *Attorney, Agent, or Firm* — Blakely Sokoloff Taylor & Zafman LLP

(57) ABSTRACT

A method is described. The method includes receiving an instruction, accessing a return cache to load a predicted return target address upon determining that the instruction is a return instruction, searching a lookup table for executable binary code upon determining that the predicted translated return target address is incorrect and executing the executable binary code to perform a binary translation.

22 Claims, 8 Drawing Sheets

/* in a typical translation that contains the translated call-instruction to a known leaf function */ mov [$single_entry_ret_buffer_addr] <= $translated-ret-target-address
    push $guest-return-target-address
    jmp $the_target_function

FIG. 5A

// generate instruction that pushes the return address onto the emulated stack
// when translating the original CALL instruction (address known at translation time)

push $guest-return-target-address

// assuming the called-function returns to the above address A in original
// code (true in most cases), we place the translation address for it into
// the 256-entry return cache, indexed by a pre-computed hash value based on A.
// i.e. $pre-computed-rcache-entry-address = hash(A);

mov $translated-ret-target -> [$pre-computed-rcache-entry-address]

// jumps to the translated target
jmp $translated_call_target

FIG. 5B

/* in translation of the leaf function, for emulating the return instruction */
    jmp [$single_entry_ret_buffer_addr]

FIG. 5C

```
translated-ret-target:
    // upon return, we should validate the return target to ensure
    // prediction by the return cache matches the original execution.
    // Assume ecx carries the value of the emulated guest %ip register
    lea [ecx, - $guest-return-target-address] -> ecx // if ecx is zero, we have a prediction hit, otherwise it is a miss
    jecxz $ret_cache_hit // when a miss, jump to the return flook lookup code to look up
    // the 2nd level table. Before that, we restore the guest %ip register value
    // by regenerating the ordinal return target address in ecx
    lea [ecx + $guest-return-target-address] -> ecx
    jmp $ret_flook_lookup $ret_cache_hit:
    // the translation of the post call instruction sequence follows
```

FIG. 5D

```
// Pop return address of the original (untranslated code) from the stack
// Assume ecx register is used as a scratch register to hold an return address of the
// guest code
pop ecx // Computes the return cache bucket by using the return address of the original
// code as a hash key
movzx cl -> ecx    // retrieve lowest 8bits of ecx as the hash value
jmp [ecx*4+$ret_cache_base]   // times 4 as return cache entry are 32bit long.
```

FIG. 5E

```
// compute the return flook bucket by using the return address of the original
// code as a hash key (in ecx). Assume eax is available as scratch register.
$ret_flook_lookup
mov cl -> eax
mov [eax * 8 + $ret_flook_base] -> eax   // loads the translated return target
lea [ecx, eax] -> ecx
jecxz ret_flook_hit
jmp ret_flook_miss              // jumps to rflook miss handler (not shown)

ret_flook_hit:
    mov al, ecx
    jmp [ecx * 8 + $ret_flook_base + 4]     // jumps to the translated code
```

FIG. 5F

BINARY TRANSLATION MECHANISM

FIELD

Embodiments described herein generally relate to electronic security. More particularly, embodiments relate to handling return branches in a binary translation system.

BACKGROUND

The present disclosure pertains to the field of information processing, and more particularly, to the field of managing interrupts in an information processing system.

Binary translation features the emulation of one instruction set by another through translation of binary code. Thus, sequences of instructions are translated from a source to a target instruction set. Such translation may be implemented in hardware (e.g., by circuits in a processor) or in software (e.g., run-time engines, static recompiler and emulators). Various software methods have been implemented to perform binary translation of return operations, which causes instruction execution to leave a current subroutine and resume at a point in code immediately after where the subroutine was called (e.g., return address). These methods include a fast lookup hash table; a return cache; a shadow stack and inlining. However, none of the existing methods satisfy both performance and low memory footprint requirements when multi-threaded modern applications are targeted.

The fast look-up hash table and return cache methods use a simple hashing function to look up a table to minimize the overhead of the prediction operation. As a result, both the fast look-up and return cache methods require the binary translation system to allocate at least medium amount of memory (e.g., 256 KB) per thread instance to yield high hit rates and performance gain. However, both methods significantly impact the total memory consumption of the binary translation system when running modern multi-threaded applications. For example, some web browsers create more than 80 threads. Thus, allocation of 256 KB of the return cache per thread results in consuming more than 20 MB of memory for just improving the performance of the return operations.

Higher memory consumption limits applicability of the fast look-up hash table and return cache methods for supporting modern highly multi-threaded applications. Specifically, a larger buffer footprint impacts performance by affecting data cache hit rates when accessing the buffer. Sharing of the single return cache among multiple threads is not desirable because it introduces cache pollution issues as well as thread-synchronization issues and thus impacts performance negatively as a result.

A shadow stack approach, which allocates a dedicated hidden stack for the binary translation system to track and predict the return address of the translated target, may provide both high predictability with a small memory footprint impact. However, in a host instruction set architecture (ISA) supporting a small register set (e.g. x86), the shadow stack approach suffers from higher performance overhead due to high runtime maintenance cost of the shadow stack operations including extra register spill and fill operations for managing the shadow stack pointer and implementing "push" and "pop" operations. Thus, the shadow stack approach provides little benefit for improving the performance of the binary translation system.

Inlining generally provides high prediction with the lowest overhead but may suffer from significant code bloat. As a result, this method is only used for the hot code paths that are known to be frequently executed and when a callee function is relatively small. Otherwise, code expansion negatively impacts performance by lowering I-cache hit rates as well as increasing memory footprint.

BRIEF DESCRIPTION OF THE DRAWINGS

Embodiments are illustrated by way of example, and not by way of limitation, in the figures of the accompanying drawings in which like reference numerals refer to similar elements.

FIGS. 5A-5F illustrate embodiments of code added to a program to implement a binary translation process.

DETAILED DESCRIPTION

The present invention may be embodied in systems, apparatuses, and methods for performing binary translations for implementing return operations, as described below. In the description, numerous specific details, such as component and system configurations, may be set forth in order to provide a more thorough understanding of the present invention. In other instances, well-known structures, circuits, and the like have not been shown in detail, to avoid unnecessarily obscuring the present invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Embodiments provide for a hybrid return address prediction buffer structure that combines a return cache (return-cache) and fast lookup tables (return flook). Such an embodiment implements a hierarchical structural organization that provides a small return cache (e.g., 1 KB) as a first level, and provides a small look-up table (e.g., 2 KB) as a second level to serve as a supplementary cache of the first level return cache to improve an overall hit rate. According to one embodiment, the return-cache and return flook table include 256 entries. However, embodiments may implement other quantities of entries.

In one embodiment, a device may comprise, for example, a memory module, a binary translator module and a processing module. The memory module may be to maintain program state information corresponding to a program. The binary translator module may be to receive an indication of an attempt by the program to execute a protected function, to cause at least one element of the program state information to be relocated in the memory module, and to translate instructions in the program into executable binary code based on the relocated at least one element of the program state information. The processing module may be to execute the executable binary code.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or an expression that is implemented or embodied in a hardware structure (e.g., flash memory or read only memory). Examples of firmware are microcode, writable control store, and micro-programmed structure.

Figure 1:
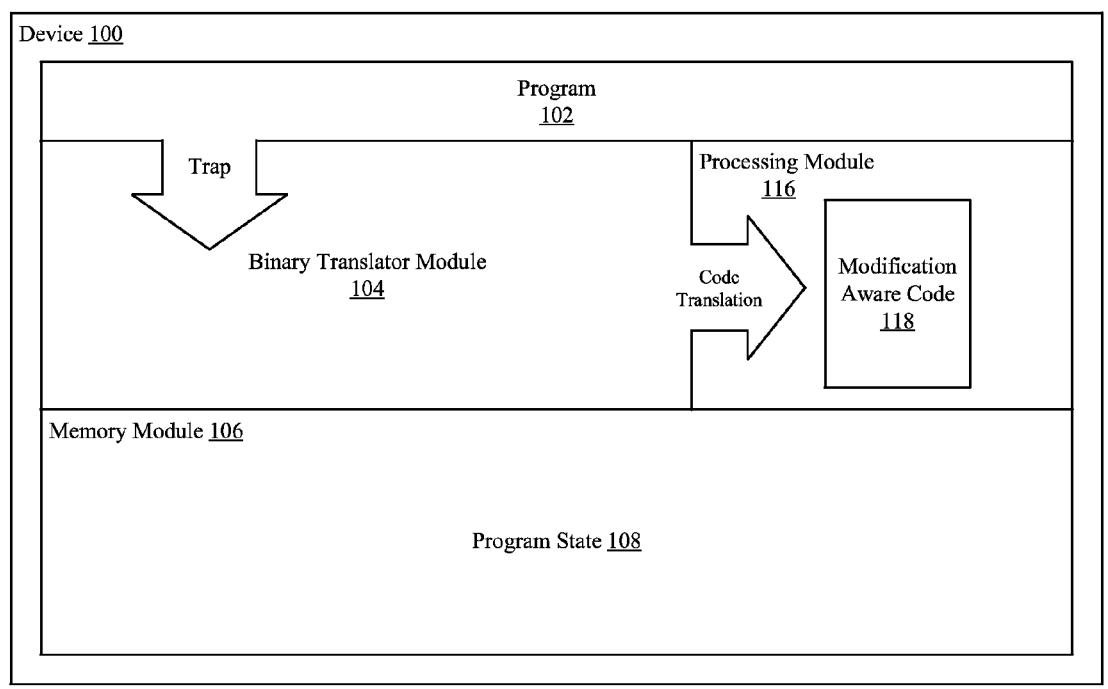
FIG. 1 illustrates one embodiment of a binary translation mechanism.

FIG. 1 illustrates one embodiment of a device 100 to implement a binary translation mechanism. According to one embodiment, device 100 may include resources to perform binary translation of return operations. Examples of device 100 may include, but are not limited to, mobile communication devices such as cellular handsets or smartphones based on the Android® operating system (OS), iOS®, Windows® OS, Blackberry® OS, Palm® OS, Symbian® OS, etc., mobile computing devices such as tablet computers like an iPad®, Galaxy Tab®, Surface®, Kindle Fire®, etc., Ultrabooks® including a low-power chipset manufactured by Intel Corporation, netbooks, notebooks, laptops, palmtops, etc., and typically stationary computing devices such as a desktops, servers, set-top boxes, etc.

Device 100 may include, for example, program 102, binary translator module 104, memory module 106 containing program state 106 and processing module 114. Program 102 may include a variety of software that may be enabled to execute on device 100. Device 100 may be configured to, for example, cause program 102 to trap to binary translator module 104 when program 102 attempt to call certain functions (e.g., gadgets) in device 100. Binary translator module 104 may be configured to translate program 102 into executable binary code.

In one embodiment, binary translator module 104 may generate modification aware code 118 for execution by processing module 116. While not shown, modification aware code 118 may be stored in a code cache module (not shown). Modification aware code 118 may perform all of the functions defined in program 102, but as opposed to operating from the main program stack, modification aware code 118 may operate using memory locations defined in the modified program state. Moreover, an intruder (not shown) may attempt to gain control over the program stack in order to insert program calls to gadgets to piece together operations hostile to device 100 (e.g., to steal or delete information from device 100, to gain control of device 100, etc.). However, since the program stack of device 100 is not updated with the new locations of the relocated elements of program state 108, the operations will not access desired information (e.g., they will attempt to access the original program state locations 110) and the attack will fail.

Figure 2:
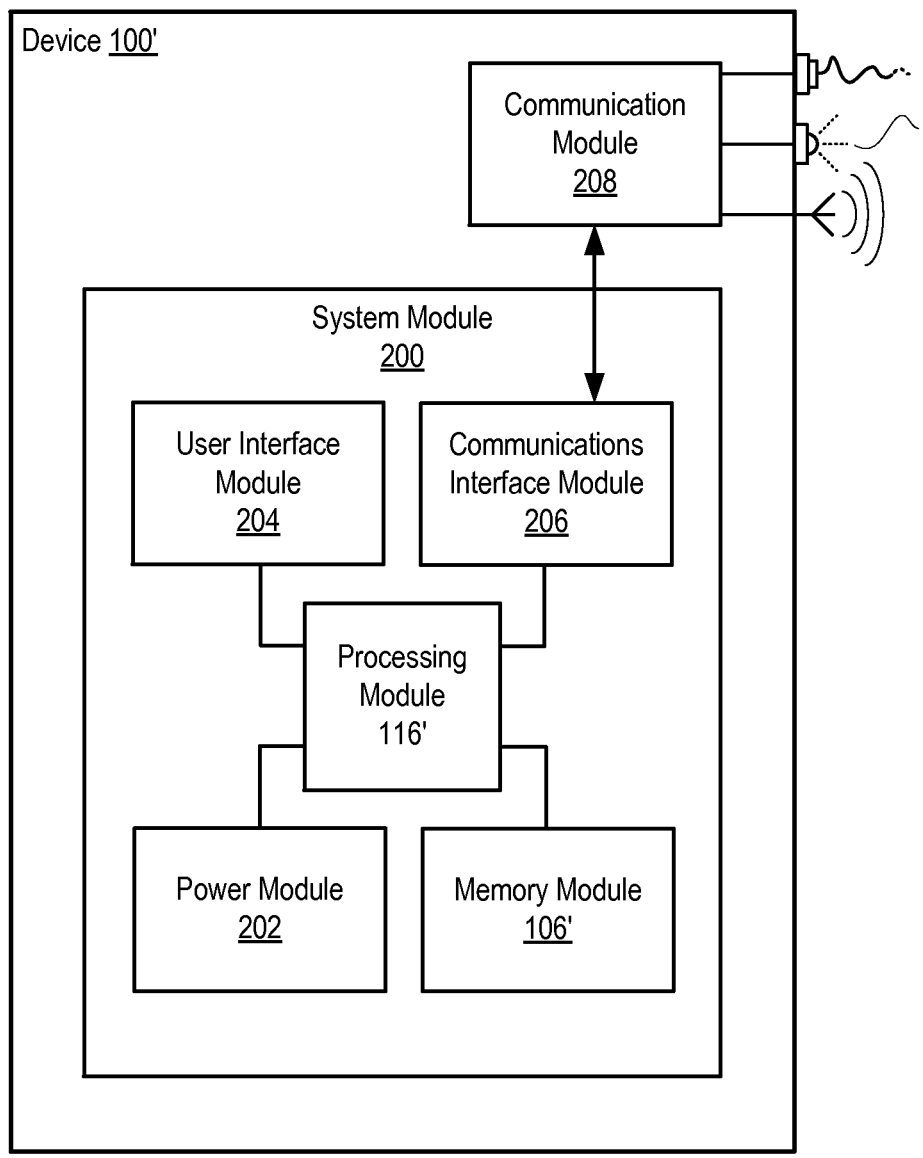
FIG. 2 illustrates one embodiment of a device.

FIG. 2 illustrates an embodiment of device 100' usable in accordance with at least one embodiment of the present disclosure. Device 100' is an example of equipment usable to perform operations such as shown in FIG. 1. While embodiments consistent with the present disclosure may employ device 100', these embodiments are not limited only to devices with the disclosed configuration. Example device 100' may include system module 200 configured to manage device operations. System module 200 may include, for example, processing module 116', memory module 106', power module 202, user interface module 204 and communications interface module 206 for interacting with communication module 208. While communication module 208 has been illustrated as separate from system module 200, this location is merely for the sake of explanation herein. Some or all of the functionality associated with communication module 208 may also be incorporated within system module 200.

In device 100', processing module 116' may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium®, Xeon®, Itanium®, Celeron®, Atom®, Core® i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 116' may interact with other system components that may be operating at different speeds, on different buses, etc. in device 100'. Some or all of the functionality commonly associated with the support circuitry may also be included in the same physical package as the processor (e.g., an SOC package like the Sandy Bridge integrated circuit available from the Intel® Corporation).

Processing module 116' may be configured to execute various instructions in device 100'. Instructions may include program code configured to cause processing module 116' to perform activities related to reading data, writing data, processing data, formulating data, converting data, transforming data, etc. In one embodiment, processing module 116' may be configured to perform various functions particular to the disclosed embodiments including, for example, the some or all of the functions of binary translator module 104. Information (e.g., instructions, data, etc.) may be stored in memory module 106'. Example information may comprise some or all of program 102, binary translator module 104 and program state 108.

Memory module 106' may comprise random access memory (RAM) or read-only memory (ROM) in a fixed or removable format. RAM may include memory configured to hold information during the operation of device 100' such as, for example, static RAM (SRAM) or Dynamic RAM (DRAM). ROM may include memories configured as BIOS, UEFI, etc. for providing startup instructions when device 100' activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. In one embodiment, memory module 106' may include a code cache module for storing executable binary code.

Power module 202 may include internal power sources (e.g., a battery) and/or external power sources (e.g., electromechanical or solar generator, power grid, fuel cells, etc.), and related circuitry configured to supply device 100' with the power needed to operate. User interface module 204 may comprise componentry configured to allow users to interact with device 100' such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and various output mechanisms (e.g., speakers, displays, lighted/flashing indicators, electromechanical components for vibration, motion, etc.).

Communication interface module 206 may be configured to handle packet routing and other control functions for communication module 208, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 206 may be configured to prevent wireless communications that are active in communication module 208 from interfering with each other. In performing this function, communication interface module 206 may schedule activities for communication module 208 based on, for example, the relative priority of messages awaiting transmission.

In an example of operation, processing module 116' may execute program 102 and then trap program 102 into binary translator module 104 based on, for example, an attempt to call a protected function in device 100. Processing module 116' may be involved in binary translator module 104 relocating program state 108 stored in memory module 106' and translating program 102 into modification aware code 118 based on the modified program state. Processing module 116' may be involved in executing modification aware code 118. It is important to note that while in the above example modules are identified as the primary actors, it is also possible for other modules not illustrated in FIG. 2 (e.g., a specialized hardware/software-based binary translator module 104) to operate alone or in conjunction with the above example modules.

Figure 3A:
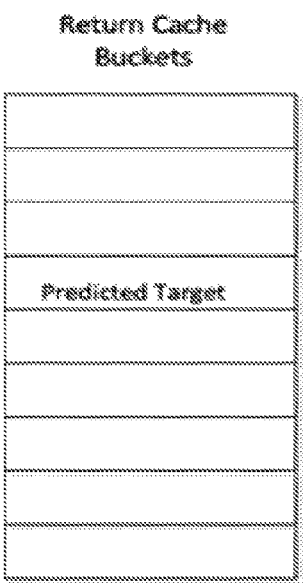
FIG. 3A illustrates one embodiment of a return cache.
Figure 3B:
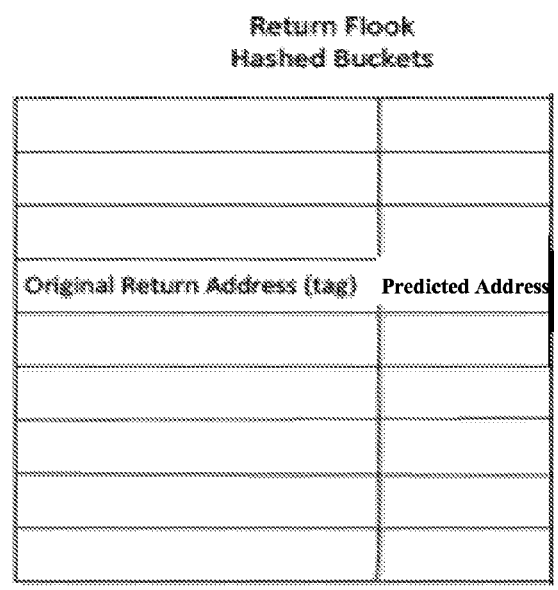
FIG. 3B illustrates one embodiment of a return lookup table.

According to one embodiment, binary translator module 104 performs binary translations of return instructions based on a hybrid return address prediction buffer structure implemented at memory 106. In such an embodiment, a first level return-cache is searched and a second level flook table is searched if there is a miss in the return-cache. FIG. 3A illustrates one embodiment of a return cache, while FIG. 3B illustrates one embodiment of a return flook table. In one embodiment, the return-cache is filled by binary translator module 104 performing a predicted translation return address in response to receiving a call instruction. In a further embodiment, return flook table entries are filled by a slow look-up path of binary translator module 104 when there is a miss in the return flook table. This process effectively caches entries that caused collisions in the first level return-cache table in order to improve overall hit rate.

In an optional embodiment, a single-entry return address buffer is augmented for memorizing a return address of leaf functions. In such an embodiment, a first level is provided as a single-entry return address buffer for a leaf function, a second level is provided as a return cache, and third level being provided as the return flook table to serve as a supplementary cache of the second level level return cache to improve the overall hit rate.

Figure 4A:
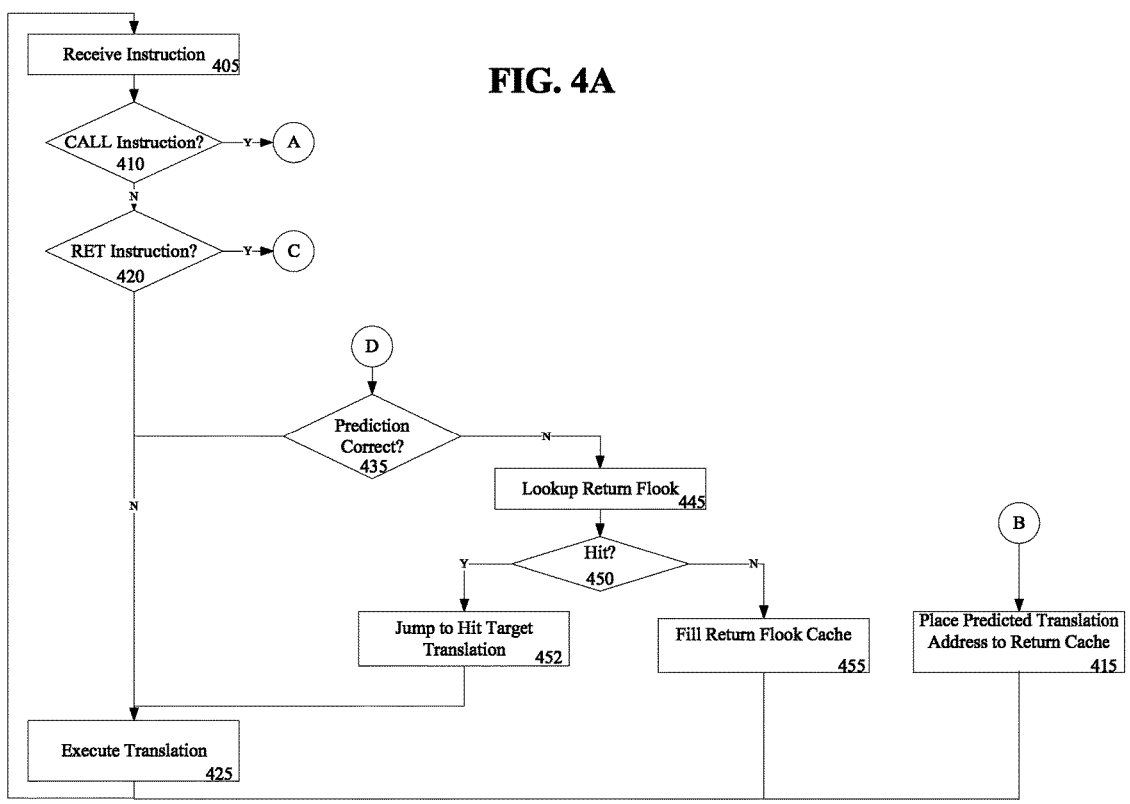
FIGS. 4A & 4B is a flow diagram illustrating one embodiment of a binary translation process.
Figure 4B:
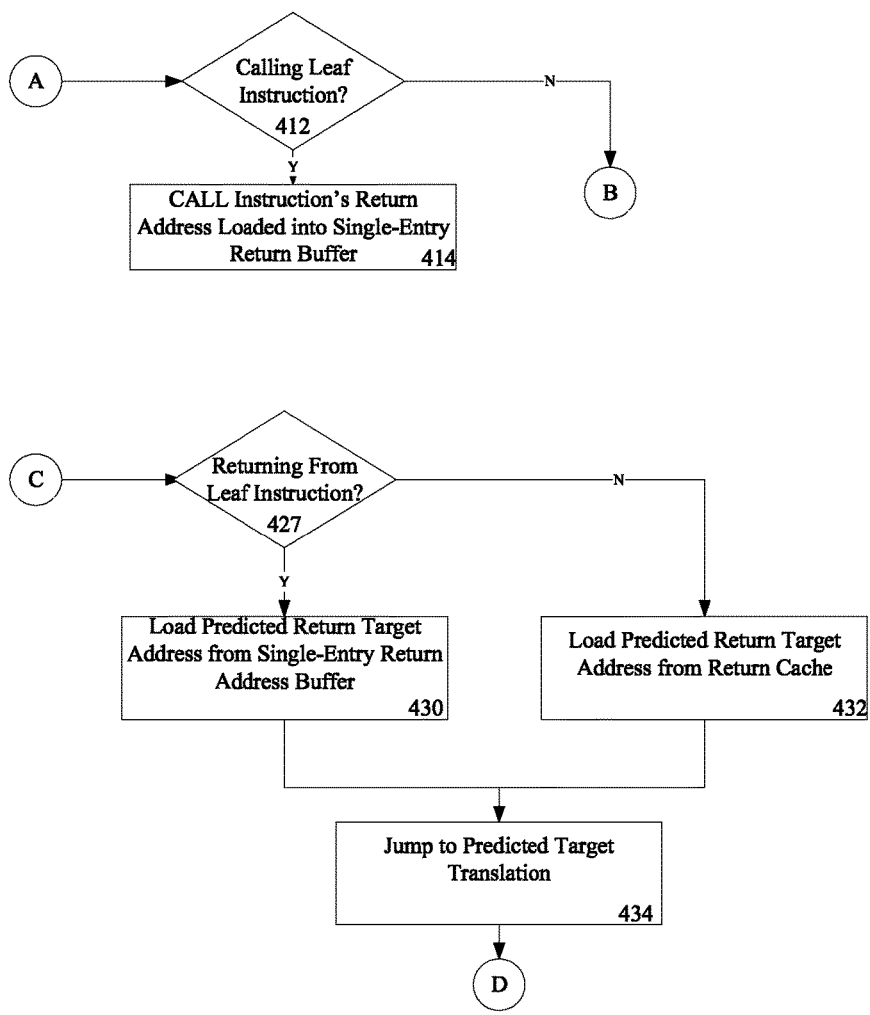

FIGS. 4A & 4B illustrate one embodiment of a method 400 for enabling posted interrupts at a virtual processor. Method 400 may be performed by processing logic that may comprise hardware (e.g., circuitry, dedicated logic, programmable logic, etc.), software (such as instructions run on a processing device), or a combination thereof. In one embodiment, method 300 may be performed by binary translator module 104. The processes of method 400 are illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-3 may not be discussed or repeated here.

Method 400 begins at processing block 405 with an instruction being received. At decision block 410, a determination is made as to whether the instruction is a call instruction. If so, a determination is made as to whether the call instruction is calling a leaf instruction, decision block 412. If the call instruction is calling a leaf instruction, the address for the call instruction after the call is loaded into the single-entry return address buffer as the predicted return target address, processing block 414. FIG. 5A illustrates one embodiment of code generation of a typical translation that includes a translated call-instruction to a known leaf function.

However, if at decision block 412, the call instruction is not calling a leaf instruction, a predicted translation address is placed in the return-cache, processing block 415. Thus, for calls to non-leaf functions and functions in which it is difficult to judge about boundaries, the return-cache and return flook are implemented. In one embodiment, the return-cache structure is provided as a direct mapped hash table with 256 entries. For instance, the return target address (CALL+1) of an original code (un-translated) can be used as a key for hashing and the index can be pre-computed at translation time to reduce the runtime overhead. FIG. 5B illustrates one embodiment of code generation of a CALL instruction in a 32-bit x86 binary translation system.

Referring back to FIG. 4, control is returned to processing block 405 where another instruction is received. The process continues at decision block 420 where a determination is made as to whether the instruction is a return instruction, upon a determination that the instruction is not a call instruction. If the instruction is determined not to be a return instruction, the instruction is another type of instruction in which a translation is executed at processing block 425. However if the instruction is determined to be a return instruction, a determination is made as to whether the return instruction is returning from a leaf instruction, decision block 427.

If the return instruction is returning from a leaf instruction, the predicted return target address is loaded from the single-entry return address buffer, processing block 430. FIG. 5C illustrates one embodiment of code generation of a translation of the leaf function, for emulating the return instruction. If the return instruction is not returning from a leaf instruction, the predicted return target is loaded from the return-cache, processing block 432.

In one embodiment, the translated return address is stored to the return-cache by translating the call instruction to a code sequence that chooses a return cache bucket based on a simple hash of a guest return address (e.g., the address of the next instruction following the call instruction). Subsequently, the translated return target address is stored. In a further embodiment, the return cache bucket includes a single field having the predicted translated return target address. Although the cache structure is discussed with reference to a simple direct-map return with 256 entries, where hash(x)=(x) mod 256, other embodiments may implement other cache structures.

In response to either decision of decision block 427, a subsequent jump to the predicted target translation is performed, processing block 434. At decision block 435, a determination is made as to whether the prediction is correct. In one embodiment, the return target is validated to ensure prediction by the return-cache matches original execution. FIG. 5D illustrates one embodiment of code generation for validating a return target. If the prediction is correct, the return instruction is translated at processing block 425.

According to one embodiment, the return instruction is translated to a code sequence that retrieves the translated return address by indexing into the return-cache based on a hash of the native return address, and blindly performing an indirect control transfer at this address. In one embodiment, mis-translated returns (e.g., due to cache collisions or irregular return pattern (e.g. manipulated return address) are handled by binary translator module 104 emitting verification code at the translated return target, which compares the predicted guest return address and a runtime guest address popped from a call stack. Otherwise, binary translator module 104 will dispatch to the return-flook table. FIG. 5E illustrates one embodiment of code generation for translating a return instruction.

If at decision block 435, it is determined that the prediction is not correct, the return flook table is accessed, processing block 445. According to one embodiment, the return flook is a direct map look-up table with 256 entries indexed by a simple hash of the application return target address. In such an embodiment, each bucket has a guest return target address and translation code mapped to the return target address. However, other embodiments may feature an implementation of the return flook table having different structures.

At decision block 450, a determination is made as to whether there is a match of the guest return target address (e.g., return flook hit). If a match of the guest return target address is found, the process jumps to the found translation target, processing block 452. Subsequently, the return instruction is translated at processing block 425. If a match is not found at decision block 450, the return flook cache is filled, processing block 455. As discussed above, a slow look-up path of binary translator module 104 fills the return flook table entries. FIG. 5F illustrates one embodiment of code generation for an implementation of the return flook table.

The above-described hybrid return address prediction buffer enables a memory saving, while retaining return handling performance. Moreover, the total memory consumption of the hybrid return cache structure per thread is merely 3 KB per thread, as opposed to 256 KB of the existing return cache implementation.

Despite such a small fraction of the original 256 KB return cache buffer size, the hybrid buffer structure yields the same level of the total hit rate (e.g., 99%) and delivers the same level of the performance improvement as 256 KB return cache with the much smaller buffer size. The total memory saving with this hybrid return address prediction buffer will be more than 20 MB compared to the 256 KB return cache when the BT system runs the heavily multi-threaded browser application (e.g., greater than 80 threads).

Figure 6:
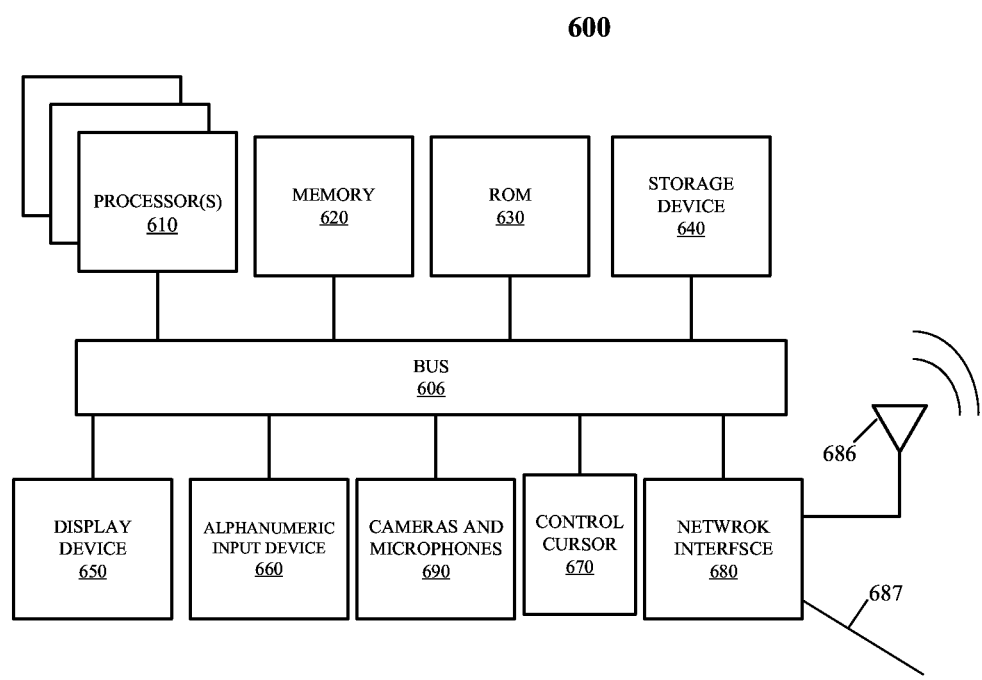
FIG. 6 illustrates one embodiment of a computer system.

FIG. 6 illustrates a diagrammatic representation of a computing system 600. Computing system 600 includes bus 605 (or, for example, a link, an interconnect, or another type of communication device or interface to communicate information) and processor 610 coupled to bus 605 that may process information. While computing system 600 is illustrated with a single processor, electronic system 600 and may include multiple processors and/or co-processors, such as one or more of central processors, graphics processors, and physics processors, etc. Computing system 600 may further include random access memory (RAM) or other dynamic storage device 620 (referred to as main memory), coupled to bus 605 and may store information and instructions that may be executed by processor 610. Main memory 620 may also be used to store temporary variables or other intermediate information during execution of instructions by processor 610.

Computing system 600 may also include read only memory (ROM) and/or other storage device 630 coupled to bus 605 that may store static information and instructions for processor 610. Date storage device 640 may be coupled to bus 605 to store information and instructions. Date storage device 640, such as magnetic disk or optical disc and corresponding drive may be coupled to computing system 600.

Computing system 600 may also be coupled via bus 605 to display device 650, such as a cathode ray tube (CRT), liquid crystal display (LCD) or Organic Light Emitting Diode (OLED) array, to display information to a user. User input device 560, including alphanumeric and other keys, may be coupled to bus 605 to communicate information and command selections to processor 610. Another type of user input device 660 is cursor control 670, such as a mouse, a trackball, a touchscreen, a touchpad, or cursor direction keys to communicate direction information and command selections to processor 610 and to control cursor movement on display 650. Camera and microphone arrays 690 of computer system 600 may be coupled to bus 605 to observe gestures, record audio and video and to receive and transmit visual and audio commands.

Computing system 600 may further include network interface(s) 580 to provide access to a network, such as a local area network (LAN), a wide area network (WAN), a metropolitan area network (MAN), a personal area network (PAN), Bluetooth, a cloud network, a mobile network (e.g., 3$^{rd}$ Generation (3G), etc.), an intranet, the Internet, etc. Network interface(s) 680 may include, for example, a wireless network interface having antenna 685, which may represent one or more antenna(e). Network interface(s) 580 may also include, for example, a wired network interface to communicate with remote devices via network cable 687, which may be, for example, an Ethernet cable, a coaxial cable, a fiber optic cable, a serial cable, or a parallel cable.

Network interface(s) 680 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 680 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 680 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 600 may vary from implementation to implementation depending upon numerous factors, such as price constraints, performance requirements, technological improvements, or other circumstances. Examples of the electronic device or computer system 600 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system for facilitating hybrid communication according to embodiments and examples described herein.

Some embodiments pertain to Example 1 that includes a binary translation device that includes a memory module to maintain a hierarchical structural organization including a cache; and a lookup table, a binary translation module to translate instructions into executable binary code and perform return address prediction of a return instruction by searching the cache for a predicted translated return target address and searching the lookup table for executable binary code upon determining that the predicted translated return target address is incorrect and a processing module to execute the executable binary code.

Example 2 includes the subject matter of Example 1, further comprising a return address buffer, wherein the binary translation module searches the return address buffer for the translated return target address prior to perform translation of a leaf instruction.

Example 3 includes the subject matter of Example 1, wherein the cache comprises buckets including a single field storing the predicted translated return target address.

Example 4 includes the subject matter of Example 3, wherein an entry is added to the cache by binary translator module storing the predicted translated return address in response to receiving a call instruction.

Example 5 includes the subject matter of Example 4, wherein the predicted translated return address is stored to the return cache by translating the call instruction to a code sequence that chooses a return cache bucket based on a hash of a guest return address.

Example 6 includes the subject matter of Example 1, wherein the binary translation module translates the return instruction to a code sequence that retrieves the translated return address by indexing the cache and performing an indirect control transfer at translated return address.

Example 7 includes the subject matter of Example 6, wherein the lookup table is searched to determine whether there is a match for the guest return target address.

Example 8 includes the subject matter of Example 7, wherein the lookup table is a direct map look-up table indexed by a hash of a return target address.

Example 9 includes the subject matter of Example 8, wherein the lookup table comprises buckets including the guest return target address and translation code mapped to the return target address.

Example 10 includes the subject matter of Example 9, wherein the lookup table is filled by binary translator module performing a slow look-up path when there is a miss in the lookup table.

Some embodiments pertain to Example 11 that includes a binary translation method comprising receiving an instruction, accessing a return cache to load a predicted return target address upon determining that the instruction is a return instruction, searching a lookup table for executable binary code upon determining that the predicted translated return target address is incorrect and executing the executable binary code to perform a binary translation.

Example 12 includes the subject matter of Example 11, further comprising determining whether the return instruction is leaf instruction and accessing a return address buffer to load the predicted return target address upon determining that the instruction is a leaf instruction.

Example 13 includes the subject matter of Example 12, further comprising jumping to a predicted target translation upon determining that the predicted translated return target address is correct.

Example 14 includes the subject matter of Example 11, further comprising storing a predicted return target address in the return cache upon determining that the instruction is a call instruction.

Example 15 includes the subject matter of Example 14, further comprising determining whether the call instruction is a leaf instruction and loading the address of the call instruction into a return address buffer upon determining that the instruction is a leaf instruction.

Example 16 includes the subject matter of Example 14, wherein the predicted translated return address is stored to the return cache by translating the call instruction to a code sequence that chooses a return cache bucket based on a hash of a guest return address.

Example 17 includes the subject matter of Example 16, further comprising determining whether the lookup table has an entry corresponding to the guest return address.

Example 18 includes the subject matter of Example 17, further comprising jumping to a predicted target translation upon determining that the lookup table has an entry corresponding to the guest return address.

Example 19 includes the subject matter of Example 17, further comprising filling an entry in the lookup table upon determining that the lookup table does not have an entry corresponding to the guest return address.

Example 20 includes the subject matter of Example 19, wherein the lookup table is filled by performing a slow look-up path.

Some embodiments pertain to Example 21 that includes at least one computer readable medium, which when executed by a processor, cause the processor to perform the methods of claims 11-20.

Some embodiments pertain to Example 22 that includes a binary translation method system comprising means for receiving an instruction, means for accessing a return cache to load a predicted return target address upon determining that the instruction is a return instruction, means for searching a lookup table for executable binary code upon determining that the predicted translated return target address is incorrect and means for executing the executable binary code to perform a binary translation.

Example 23 includes the subject matter of Example 19, further comprising means for determining whether the return instruction is leaf instruction and means for accessing a return address buffer to load the predicted return target address upon determining that the instruction is a leaf instruction.

Example 24 includes the subject matter of Example 21, further comprising means for jumping to a predicted target translation upon determining that the predicted translated return target address is correct.

Example 25 includes the subject matter of Example 21, further comprising means for storing a predicted return target address in the return cache upon determining that the instruction is a call instruction.

Some embodiments pertain to Example 26 that includes at least one computer readable medium, which when executed by a processor, cause the processor to perform receiving an instruction, accessing a return cache to load a predicted return target address upon determining that the instruction is a return instruction, searching a lookup table for executable binary code upon determining that the predicted translated return target address is incorrect and executing the executable binary code to perform a binary translation.

Example 27 includes the subject matter of Example 26, which when executed by a processor, cause the processor to further perform determining whether the return instruction is leaf instruction; and accessing a return address buffer to load the predicted return target address upon determining that the instruction is a leaf instruction.

Example 28 includes the subject matter of Example 27, which when executed by a processor, cause the processor to further perform jumping to a predicted target translation upon determining that the predicted translated return target address is correct.

Example 29 includes the subject matter of Example 26, which when executed by a processor, cause the processor to further perform storing a predicted return target address in the return cache upon determining that the instruction is a call instruction.

Example 30 includes the subject matter of Example 29, which when executed by a processor, cause the processor to further perform determining whether the call instruction is a leaf instruction and loading the address of the call instruction into a return address buffer upon determining that the instruction is a leaf instruction.

Example 31 includes the subject matter of Example 29, wherein the predicted translated return address is stored to the return cache by translating the call instruction to a code sequence that chooses a return cache bucket based on a hash of a guest return address.

Example 32 includes the subject matter of Example 31, which when executed by a processor, cause the processor to further perform determining whether the lookup table has an entry corresponding to the guest return address.

Example 33 includes the subject matter of Example 32, which when executed by a processor, cause the processor to further perform jumping to a predicted target translation upon determining that the lookup table has an entry corresponding to the guest return address.

Example 34 includes the subject matter of Example 32, which when executed by a processor, cause the processor to further perform filling an entry in the lookup table upon determining that the lookup table does not have an entry corresponding to the guest return address.

Example 35 includes the subject matter of Example 34, wherein the lookup table is filled by performing a slow look-up path.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. A binary translation device comprising:
   a memory module to maintain a hierarchical structural organization, including:
      a cache; and
      a lookup table;
   a binary translation module to translate instructions into executable binary code and perform return address prediction of a return instruction by searching the cache for a predicted translated return target address and searching the lookup table for executable binary code upon determining that the predicted translated return target address is incorrect, wherein the binary translation module further to translate the return instruction to a code sequence that retrieves the predicted translated return target address by indexing the cache and performing an indirect control transfer at the predicted translated return address; and
   a processing module to execute the executable binary code.

2. The device of claim 1, further comprising a return address buffer, wherein the binary translation module to search the return address buffer for the predicted translated return target address prior to performing translation of a leaf instruction.

3. The device of claim 1, wherein the cache comprises buckets including a single field to store the predicted translated return target address.

4. The device of claim 3, wherein an entry is added to the cache by the binary translator module to store the predicted translated return address in response to receiving a call instruction.

5. The device of claim 4, wherein the predicted translated return target address is stored to the return cache by translating the call instruction to a code sequence that chooses a return cache bucket based on a hash of a guest return address.

6. The device of claim 5, wherein the lookup table is searched to determine whether there is a match for the guest return target address.

7. The device of claim 6, wherein the lookup table is a direct map look-up table indexed by a hash of a return target address.

8. The device of claim 7, wherein the lookup table comprises buckets including the guest return target address and translation code mapped to the return target address.

9. The device of claim 8, wherein the lookup table is filled by the binary translator module performing a slow look-up path when there is a miss in the lookup table.

10. At least one non-transitory computer readable medium, which when executed by a processor, cause the processor to perform operations comprising:
    receiving an instruction;
    determining whether the instruction is a return instruction;
    determining whether the return instruction is a leaf instruction upon determining that the instruction is a return instruction;
    accessing a return address buffer to load the predicted return target address upon determining that the instruction is a leaf instruction;
    searching a lookup table for executable binary code upon determining that the predicted return target address is incorrect; and
    executing the executable binary code to perform a binary translation.

11. The at least one computer readable medium of claim 10, which when executed by a processor, cause the processor to further perform jumping to a predicted target translation upon determining that the predicted return target address is correct.

12. At least one non-transitory computer readable medium, which when executed by a processor, cause the processor to perform operations comprising:
    receiving an instruction;
    accessing a return cache to load a predicted return target address upon determining that the instruction is a return instruction;
    searching a lookup table for executable binary code upon determining that the predicted return target address is incorrect;
    executing the executable binary code to perform a binary translation; and
    storing the predicted return target address in the return cache upon determining that the instruction is a call instruction.

13. The at least one computer readable medium of claim 12, which when executed by a processor, cause the processor to further perform:
    determining whether the call instruction is a leaf instruction; and
    loading the address of the call instruction into a return address buffer upon determining that the call instruction is a leaf instruction.

14. The at least one computer readable medium of claim 12 wherein the predicted return target address is stored in the return cache by translating the call instruction to a code sequence that chooses a return cache bucket based on a hash of a guest return address.

15. The at least one computer readable medium of claim 14, which when executed by a processor, cause the processor to further perform determining whether the lookup table has an entry corresponding to the guest return address.

16. The at least one computer readable medium of claim 15, which when executed by a processor, cause the processor to further perform jumping to a predicted target translation upon determining that the lookup table has an entry corresponding to the guest return address.

17. The at least one computer readable medium of claim 15, which when executed by a processor, cause the processor to further perform filling an entry in the lookup table upon determining that the lookup table does not have an entry corresponding to the guest return address.

18. The at least one computer readable medium of claim 17, wherein the lookup table is filled by performing a slow look-up path.

19. A binary translation method comprising:
receiving an instruction;
determining whether the instruction is a return instruction;
determining whether the return instruction is a leaf instruction upon determining that the instruction is a return instruction;
accessing a return address buffer to load the predicted return target address upon determining that the instruction is a leaf instruction;
searching a lookup table for executable binary code upon determining that the predicted return target address is incorrect; and
executing the executable binary code to perform a binary translation.

20. The method of claim 19, further comprising jumping to a predicted target translation upon determining that the predicted return target address is correct.

21. The method of claim 19, further comprising storing the predicted return target address in the return cache upon determining that the instruction is a call instruction.

22. The method of claim 21, further comprising:
determining whether the call instruction is a leaf instruction; and
loading the address of the call instruction into a return address buffer upon determining that the instruction is a leaf instruction.

* * * * *